United States Patent [19]

Barnett et al.

[11] Patent Number: 4,962,942

[45] Date of Patent: Oct. 16, 1990

[54] MINIMUM ENERGY CURB NEGOTIATING WHEELCHAIR

[75] Inventors: Ralph L. Barnett, Wilmette; Steven R. Schmid, Chicago; Robert Kaplan, Skokie, all of Ill.

[73] Assignee: Triodyne Inc., Niles, Ill.

[21] Appl. No.: 354,804

[22] Filed: May 22, 1989

[51] Int. Cl.$^5$ .................... B62B 5/02

[52] U.S. Cl. .................... 280/5.28; 280/5.3; 280/250.1

[58] Field of Search .................... 280/250.1, 5.28, 5.3, 280/5.2, 5.22, 5.32, 5.24, 5.26, DIG. 10, 43.2, 43.17, 43.24; 180/8.2, 8.1, 8.3, 907, 901, 8.4, 8.7, 8.5, 8.6

[56] References Cited

U.S. PATENT DOCUMENTS

| | | | |
|---|---|---|---|
| 572,658 | 12/1896 | Marx | 280/5.28 |
| 756,419 | 4/1905 | Shoemaker | 280/43.24 |
| 2,701,005 | 2/1955 | Bennett | 280/5.3 |
| 3,573,877 | 4/1971 | Locke | 280/5.32 |
| 3,580,591 | 5/1971 | Coffey | 280/5.28 |
| 3,592,282 | 7/1971 | Soileau | 280/5.28 |
| 3,889,964 | 6/1975 | Pitts | 280/43.24 |
| 3,905,437 | 9/1975 | Kaiho | 180/15 |
| 4,132,423 | 1/1979 | Chant | 280/5.3 |
| 4,455,029 | 6/1984 | Taylor | 280/5.28 |
| 4,618,155 | 10/1986 | Jayne | 280/5.28 |
| 4,747,611 | 5/1988 | Daugherty | 280/250.1 |

*Primary Examiner*—Charles A. Marmor
*Assistant Examiner*—A. M. Boehler
*Attorney, Agent, or Firm*—Lee, Mann, Smith McWilliams & Sweeney

[57] ABSTRACT

A wheelchair which can negotiate curbs and other obstructions with a minimum of effort by the wheelchair occupant. The wheelchair has conventional front caster wheels and rear propulsion wheels, with first auxiliary support wheels located between the caster and rear wheels, and second auxiliary wheels being located outboard behind the rear wheels. The castered wheels and the rear wheels are structured to be raised or lowered by the wheelchair occupant. When a curb is encountered, the occupant propels the wheelchair forwardly until the first auxiliary wheels are at the edge of the curb, and the castered wheels are suspended. The castered wheels are then lowered to the bottom of the curb and the wheelchair propelled forward until the second auxiliary wheels are at the curb edge. The large rear wheels are then lowered to curb level, and the wheelchair is propelled by the occupant to the opposite curb, where the curb is ascended by turning the wheelchair 180° and performing the wheel adjusting process in the opposite sequence.

20 Claims, 7 Drawing Sheets

MINIMUM ENERGY CURB NEGOTIATING WHEELCHAIR

BACKGROUND OF THE INVENTION

This invention relates to wheelchairs, and in particular to a wheelchair which is structured to negotiate curbs and other obstructions with a minimum of effort expended by the wheelchair occupant. In particular, the invention pertains to a wheelchair where the center of gravity of the wheelchair need not be raised or lowered to surmount an obstacle.

The greatest barrier facing any occupant of a wheelchair is an obstruction, normally street curbs and the like. While recent programs of forming curb cuts in curbs have greatly facilitated the mobility of wheelchair occupants, given the sheer numbers of street curbs and other similar obstructions, it is doubtful that they all will ever be reconstructed to accommodate wheelchair occupants.

In the past, various efforts have been made to adapt wheelchairs to surmount curbs and other obstacles. For example, U.S. Pat. No. 4,455,029 discloses a structure with outboard auxiliary wheels which are raised or lowered to raise or lower the wheelchair to surmount a curb. U.S. Pat. No. 3,905,437 is similar, having outboard rear wheels and a central jack which are used to raise or lower the wheelchair. Other examples of wheelchairs having various devices and structures to raise and lower the wheelchair are found in U.S. Pats. No. 4,747,611; 3,573,877; 4,132,423; 2,701,005 and 4,618,155.

All of the above efforts to provide obstacle negotiating wheelchairs suffer a common disability of their own. Each requires the center of gravity of the wheelchair to be raised or lowered. Because the occupant is in the wheelchair at the time, the occupant must work against his or her own weight, if the wheelchair is mechanically operated, and if it is electrically or otherwise operated, a complex mechanism must be employed of sufficient strength to handle the weight of the occupant of the chair. Thus, considerable energy must be expended, and when the occupant is called upon to expend such energy, often he is unable to do so, whether it is by sheer lack of strength or due to injury or disability. Thus, such obstacle negotiating wheelchairs have found little utility.

SUMMARY OF THE INVENTION

The present invention relates to a wheelchair for negotiating curbs and other obstructions which is normally mechanically operated and in which the occupant expends a minimum amount of energy, and need not have superior strength, in order to negotiate such obstacles. The wheelchair of the invention is similar to a typical wheelchair, in that it has a seat for an occupant secured to a wheelchair frame, a pair of castered front wheels and a pair of primary rear wheels which are revolved by the occupant to propel the wheelchair. For negotiating curbs and other obstructions, the wheelchair of the invention is provided with a first auxiliary support located between the front and rear wheels. The first support is fixed in elevation at about the normal bearing surface of the front and rear wheels. A second auxiliary support is located behind and spaced from the rear wheels. The second support is also fixed in elevation at about the normal bearing surface of the front and rear wheels. The front castered wheels are provided with means to vertically translate the wheels to lower the wheels beneath the fixed elevation of the first support, and the rear wheels are provided with means to vertically translate them to an elevation lower than the fixed elevation of the second support. Therefore, the main wheels of the wheelchair may be raised and lowered by the occupant to negotiate obstacles, without the necessity of the occupant also raising or lowering himself, as well.

In accordance with the preferred embodiment of the invention both of the auxiliary supports comprise a pair of auxiliary wheels. Means is provided for the occupant to revolve the auxiliary rear wheels, each of the auxiliary wheels being coupled to a corresponding rear wheel. For driving of the auxiliary wheels, a sprocket is located on the auxiliary rear wheel and the associated rear wheel, and an endless chain is provided to couple the two sprockets.

For vertical translation of the front wheels, a vertical rod is secured to each of the front wheels, each rod having a helically threaded portion extending through a corresponding internally threaded member secured to the frame of the wheelchair. Each of the rods is rotated by means of a crank affixed to the top of the rod.

For vertical translation of the rear wheels, each rear wheel includes a bracket assembly secured to the rear wheel. The bracket assembly has an internally threaded segment, with a vertical rod being rotatably mounted on the frame and the rod having a helically threaded portion engaging the threaded segment. The wheel and bracket assembly is raised and lowered by rotation of the rod. A crank is affixed to the frame and is interconnected with the rod for rotation of the rod. That interconnection is provided, in the preferred embodiment of the invention, by means of an endless chain engaging a first sprocket secured to the rod and a second sprocket secured to the crank. Also included is a fixed guide for the bracket to guide its upward and downward excursions. The uide comprises at least one vertical support rod, with the bracket being slidingly secured to the support rod.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
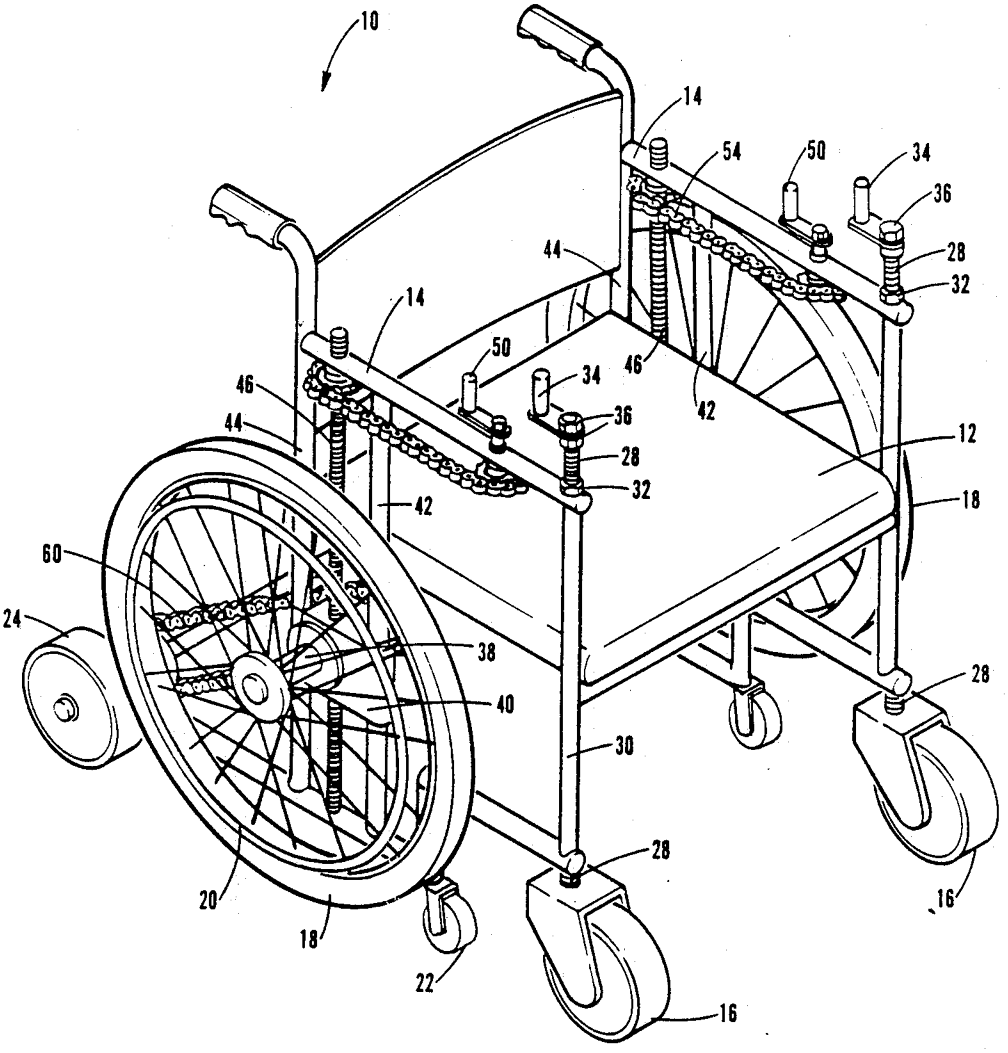
FIG. 1 is a perspective view of a wheelchair according to the invention.
Figure 2:
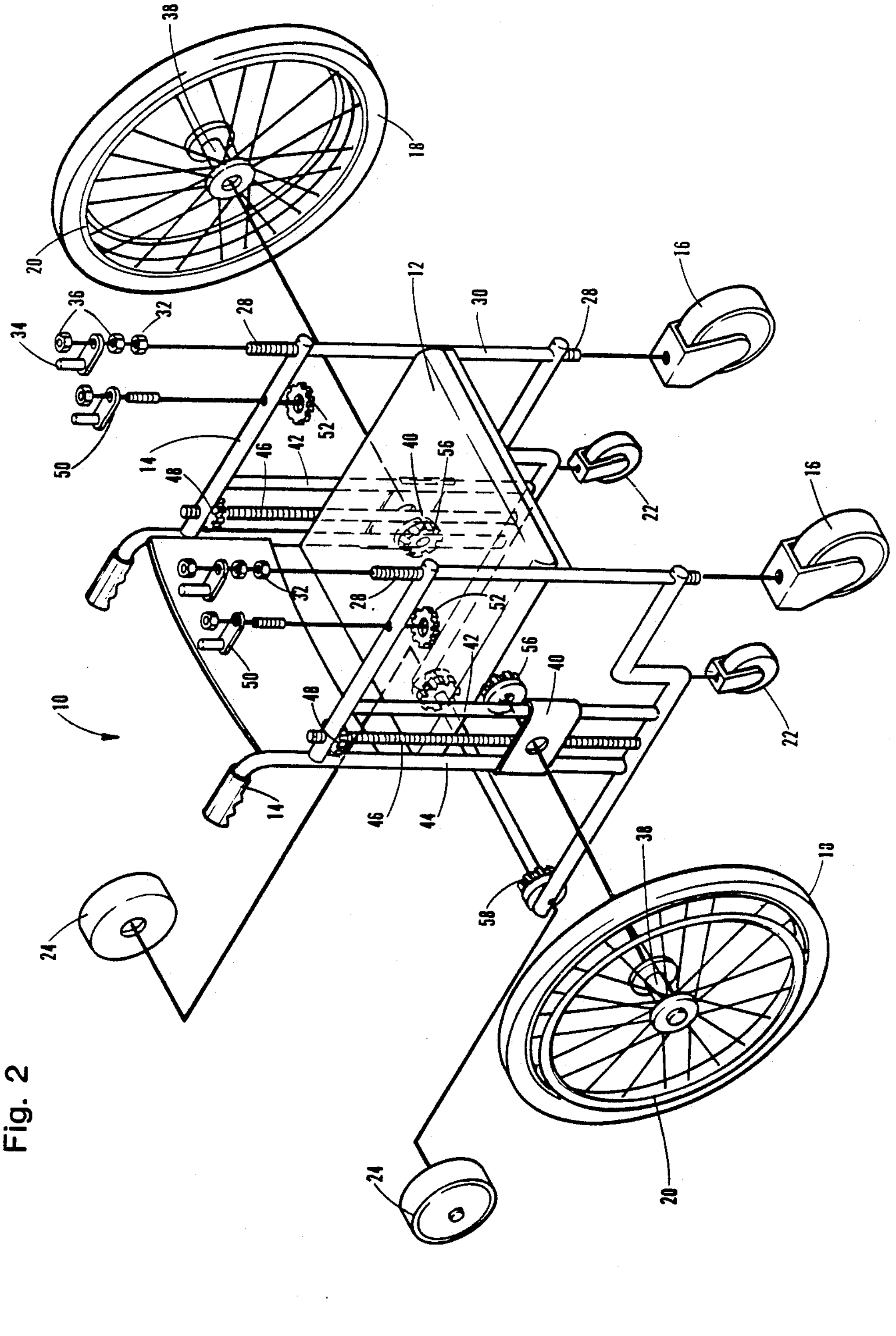
FIG. 2 is an exploded assembly view thereof, with drive chains omitted for clarity.
Figure 3:
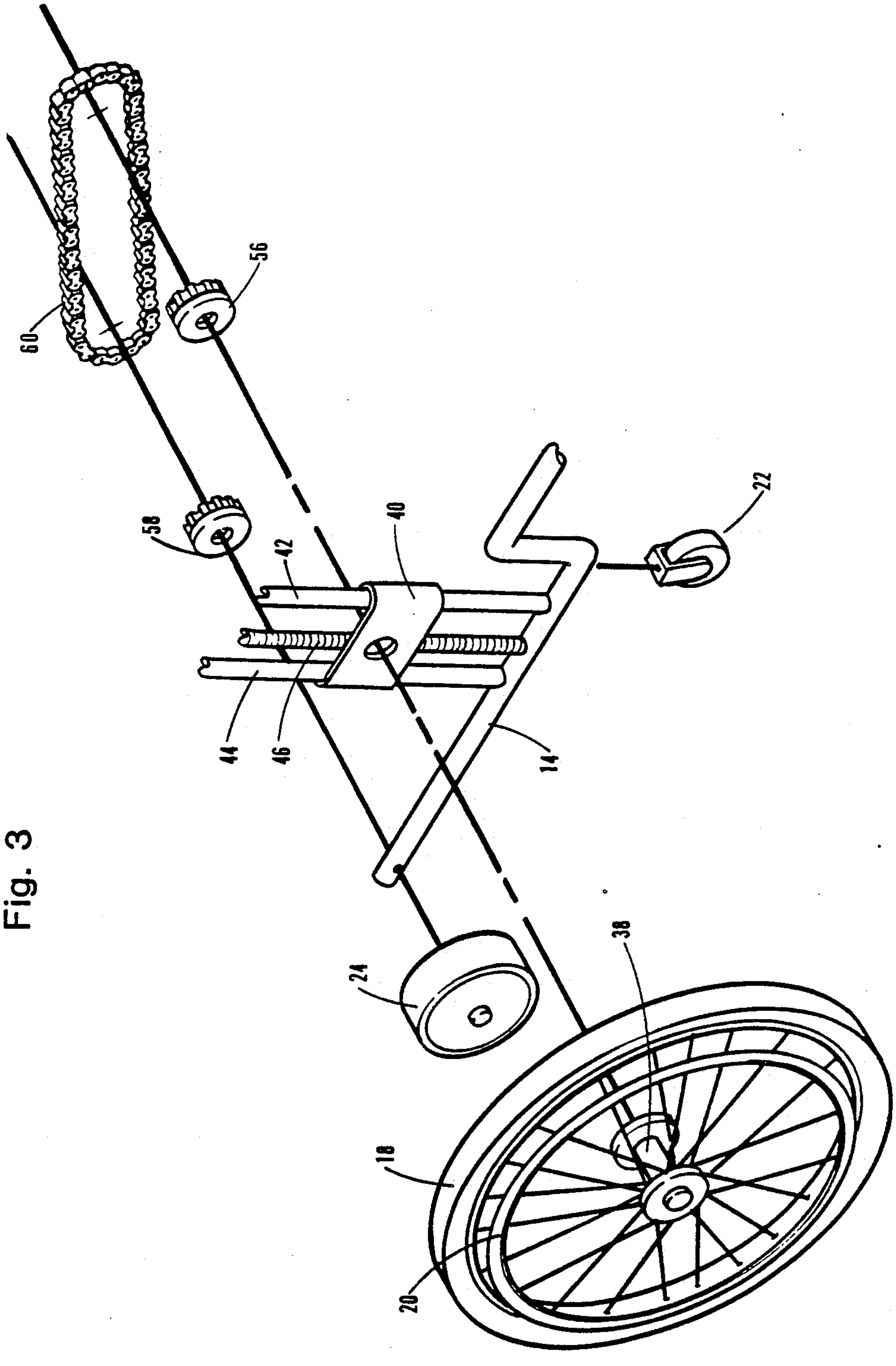
FIG. 3 is an enlarged assembly view of the rear wheel and rear auxiliary wheel and their means of interconnection.
Figure 4:
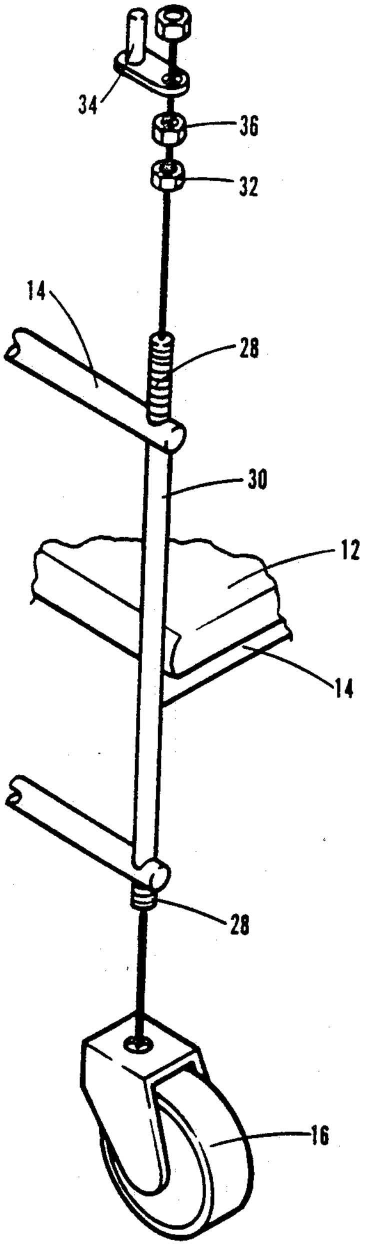
FIG. 4 is an enlarged assembly view of the means for vertical translation of one of the front caster wheels.
Figure 5:
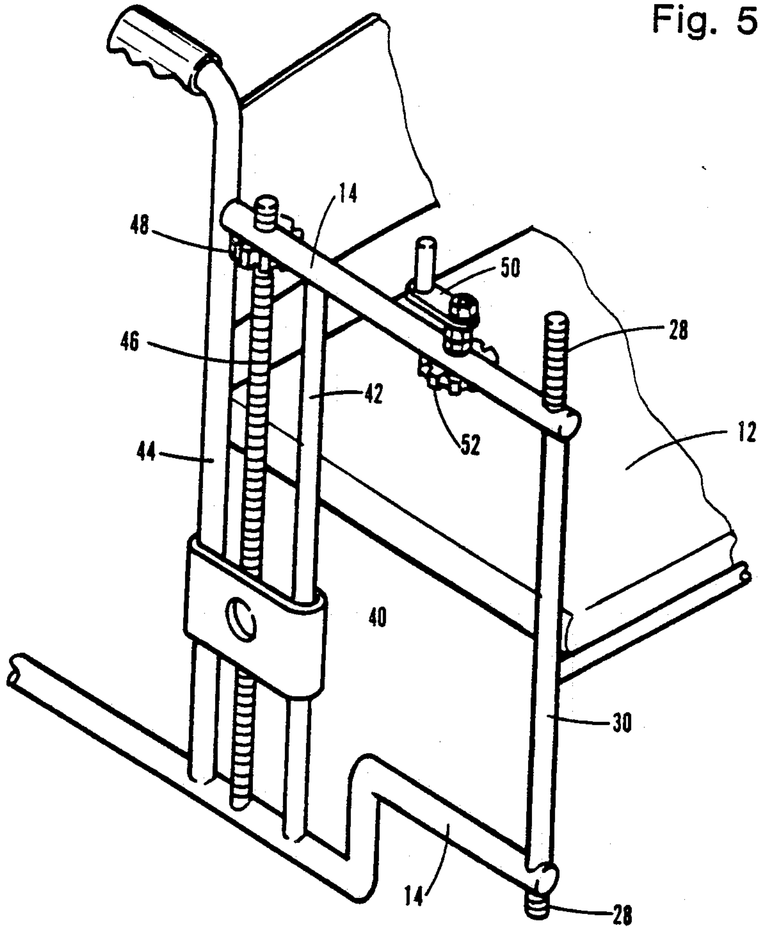
FIG. 5 is an enlarged perspective view of one side of the wheelchair, with portions removed, illustrating the means for raising and lowering one of the rear wheels.

The wheelchair according to the invention is shown generally at 10 in the drawing figures. It is constructed much the same as a conventional wheelchair, having a seat 12 secured to a frame 14, a pair of castered front wheels 16, and a pair of primary rear wheels 18 which are driven by an occupant of the wheelchair either manually by grasping the wheel or an auxiliary ring 20, or by an electric motor (not illustrated), in a conventional fashion.

A pair of auxiliary support wheels 22 is located between the front wheels 16 and the rear wheels 18. As illustrated, the wheels 22 can be castered. During normal operation of the wheelchair 10, the auxiliary wheels 22 either bear upon the surface being traversed by the wheelchair, or are slightly above that surface.

Figure 6A:
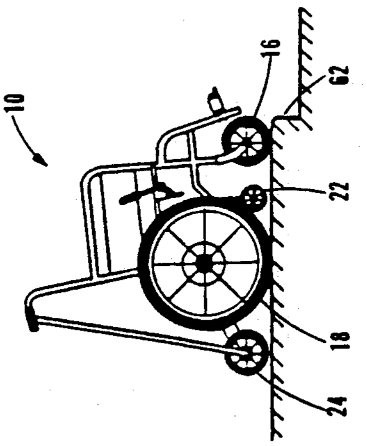
FIGS. 6A–6F illustrate in series the process by which the wheelchair according to the invention negotiates an obstruction, such as a curb, from a higher elevation to a lower elevation; and, FIGS. 7A–7G illustrate how the wheelchair according to the invention, after having negotiated the curb in FIGS. 6, negotiates a curb in the opposite direction.

A second pair of auxiliary support wheels 24 is located behind the wheelchair 10, behind and spaced from the rear wheels 18 and being mounted on an axle 26 which is secured to the frame 14. As best shown in FIGS. 6A and 7G, during normal operation of the wheelchair 10, the wheels 24 are located slightly above ground level so that the wheels 24 do not interfere with the normal function of the wheelchair.

The front wheels 16 and rear wheels 20 are mounted for vertical translation on the wheelchair 10 relative to the fixed position of the seat 12 and auxiliary wheels 22 and 24. Each of the front wheels 16 is secured to a threaded rod 28 which extends through a hollow tube 30 forming part of the frame 14. Each rod 28 is engaged through a nut 32 which is secured to the frame 14 by conventional means, such as by welding. Each of the rods 28 is topped by a crank 34 which is captured on the rod 28 between a pair of nuts 36. The wheels 16 are attached to the rods 28 to permit castering of the wheels 16 when the rods 28 are fixed in place, or to permit rotation of the rods 28 when the wheels 16 are fixed in place.

Since the nuts 32 are fixed to the frame 14, rotation of either of the rods 28 will raise or lower its attached wheel 16, depending on direction of the rotation of the rod 28. Thus, the elevation of the wheels 16 relative to that of the seat 12 can be altered during use of the wheelchair 10.

Each of the rear wheels 16 is mounted on an axle 38 which is secured to a bracket assembly 40. The bracket assembly 40, in turn, is slidingly captured on vertical tubes 42 and 44 which form part of the frame 14. For adjustment of the relative location of the bracket assembly 40, and therefore adjustment of the elevation of the wheels 18 relative to the seat 12, a threaded rod 44 is rotatably mounted in the frame 14, and engages an internally threaded segment (not illustrated in detail) forming part of the bracket assembly 40. Unlike the rods 28, the rods 46 cannot move vertically relative to the wheelchair 10, but rather are mounted solely for rotation. However, as will be evident, rotation of the rods 46 does cause the bracket assemblies 40 to be raised or lowered, depending on the direction of rotation of the rods.

Each of the rods 46 includes a sprocket 48. A crank 50 is secured to a second sprocket 52, and the two sprockets 48 and 52 are interconnected for direct drive by means of a chain 54. Thus, rotation of the cranks 50 will rotate the rods 46, raising and lowering the rear wheels 18 depending on the direction of rotation of the cranks 50.

As will be evident from the following description of the function of the wheelchair 10, for proper negotiation of a curb or other obstruction, the rear auxiliary wheels 24 must be driven. To that end, a sprocket 56 is mounted on each of the axles 38 in registration with a second sprocket 58 mounted on the axle 26 for rotation with an associated auxiliary wheel 24. A chain drivingly interconnects the sprockets 56 and 58. Thus, the wheelchair occupant, by rotation of the wheels 18, will also rotate the wheels 24.

FIGS. 6 and 7 illustrate in step-by-step form the negotiation of curbs or other similar obstructions. In FIG. 6, a curb is descended, while in FIG. 7, a curb is ascended.

In FIG. 6A, the wheelchair has approached the brink of a curb 62 or similar obstruction. While an occupant is not shown in the wheelchair 10, it should be quite evident that an occupant would be propelling the wheelchair through the series of steps required to surpass the curb 62.

Figure 6B:
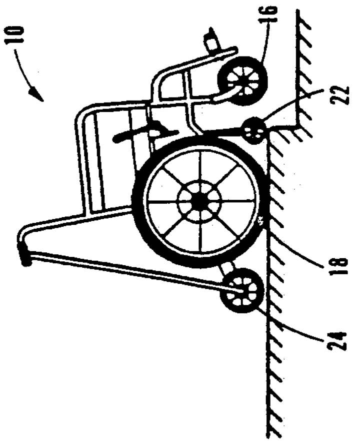
Figure 6C:
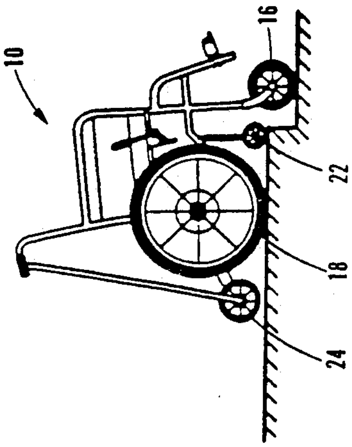

In FIG. 6B, the wheelchair has been propelled forward until the front auxiliary wheels 16 are at the brink of the curb 62. In this orientation, the front wheels 16 are suspended. FIG. 6C illustrates the next step, the front wheels 16 having been lowered by means of rotation of the cranks 34, so that the front wheels 16 are on the lower level of pavement.

Figure 6D:
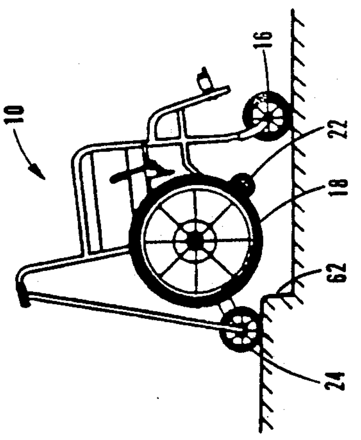
Figure 6E:
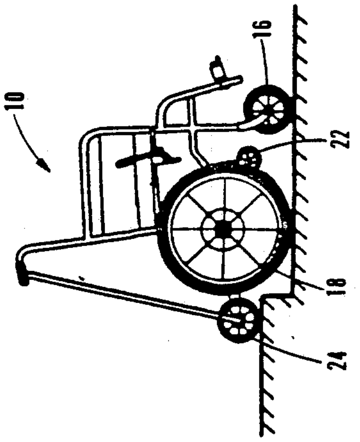
Figure 6F:
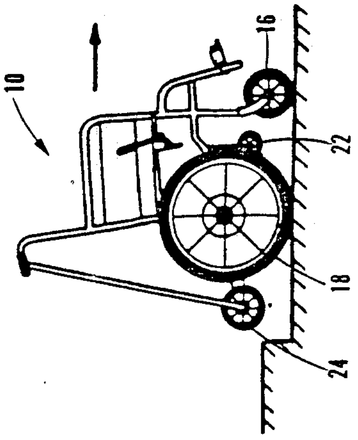

Next, the operator propels the wheelchair forward. As seen in FIG. 6D, the rear auxiliary wheels 24 must be driven because as the rear wheels 18 leave the ground, the wheelchair must continue to be propelled forward until the auxiliary wheels 24 are at the brink of the curb 62. At that location, as shown in FIG. 6E, the rear wheels 18 are then lowered by means of rotation of the cranks 50. The wheelchair is then free to proceed forwardly across the street, as depicted in FIG. 6F.

Because the wheels 16 and 18 have been lowered, the center of gravity of the wheelchair 10 has not been changed while surpassing the curb 62. Thus, the operator of the wheelchair need not expend considerable personal energy to lower himself and the chair 10, since only the relatively lighter wheels 16 and 18 have been lowered.

FIG. 7 illustrates the steps of ascension of a curb 64, which would typically be on the opposite side of a street from the curb 62. If, as shown in FIGS. 7A, the curb 64 is higher than the curb 62, an occupant of the wheelchair 10 may wish to turn the cranks 50 to raise the wheelchair sufficiently as shown in FIG. 7B. Given the mechanical advantage of the cranks 50, an occupant often will be able to do so. Otherwise, the occupant can engage the wheel 24 against the curb 64, and given the considerable mechanical advantage of the wheels 18, cause the wheel 24 to surmount the slightly higher curb 64.

Figure 7A:
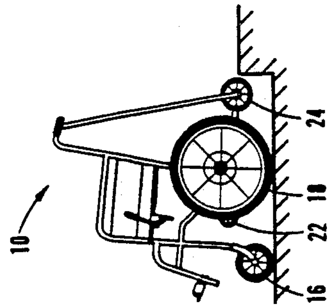
Figure 7B:
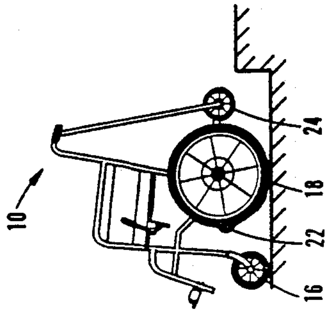
Figure 7C:
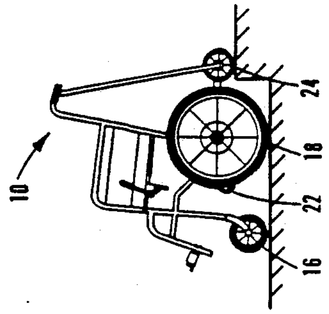
Figure 7D:
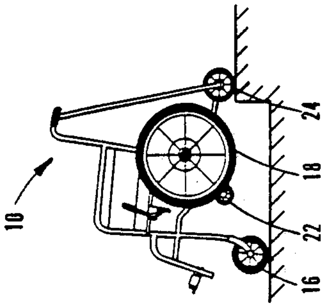
Figure 7E:
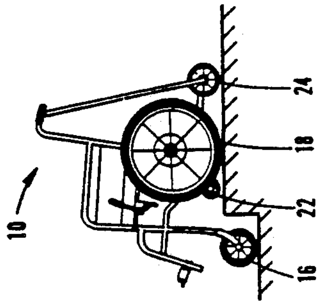
Figure 7F:
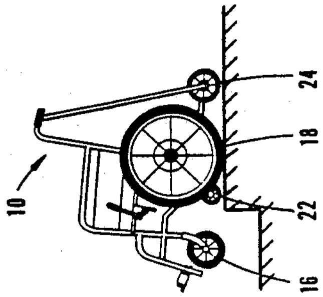
Figure 7G:
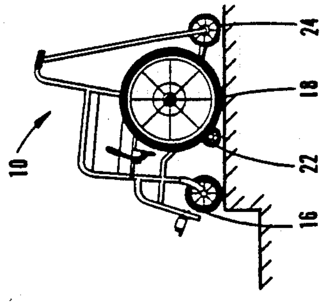

If the rear auxiliary wheels 24 are sufficiently elevated, as shown in FIG. 7B, the operator simply reverses the direction of the wheelchair 10, and backs toward the curb 64, causing the wheel 24 to engage the top of the curb 64. Then, as shown in FIG. 7D, the operator turns the cranks 50 to raise the rear wheels 18 to the elevation of the top of the curb 64. Next, the operator turns the wheels 18 to propel the wheelchair 10 rearwardly until the wheels 16 are proximate the curb 64 and the wheels 22 are on top of the curb 64. Then, as shown in FIG. 7F, the operator cranks the cranks 34 to raise the front wheels 16 sufficiently so that the chair can be propelled slightly more rearwardly, as shown in FIG. 7G, so that the wheels 16 and 18 are in contact with the ground, and at least the wheels 24 are suspended slightly to permit ease of operation and swiveling of the wheelchair 10. After the curb 64 has been surmounted, the operator will normally swivel the chair and proceed until the next obstruction is encountered.

The wheelchair 10 of the present invention provides a structure for surmounting a curb or other obstruction while expending a minimum of energy in the process. If curbs on opposite sides of street are at the same general elevation, the center of gravity of the wheelchair 10 need never be changed. Only the elevations of the wheels 16 and 18 are altered. If curbs on the opposite sides of a street are at different elevations, only a minimum of energy need be expended by the wheelchair occupant, since only the difference in height of the curbs on opposite sides of the street must be accommodated by changing the elevation of the center of gravity of the wheelchair 10, rather than, as is the case in conventional wheelchairs, negotiating the elevations on both sides of the street by raising and lowering the wheelchair the heights of the curbs.

Various changes can be made to the invention without departing fom the spirit thereof. For example only, the chain drives can be replaced by belt drives or gear drives. Also, although the wheelchair 10 is illustrated as being manually driven, obviously the wheel chair could also be self-propelled, by an electric motor or otherwise. The scope of the invention is defined by the following claims.

What is claimed is:

1. In a wheelchair having a seat for an occupant secured to a frame, a pair of castered front wheels and a pair of primary rear wheels adapted to be revolved by the occupant to propel the wheelchair, the wheels normally having bearing surfaces lying in a common surface plane, the improvement comprising means to negotiate curbs and obstructions, comprising:

a. a first auxiliary support located solely between and spaced from said front and rear wheels, said first support being fixed in elevation relative to the seat at about said surface plane, b. a second auxiliary support, separate from said first auxiliary support, located solely behind and spaced from said rear wheels, said second support being fixed in elevation relative to the seat at about said surface plane, c. means to vertically translate said front wheels to lower said wheels beneath the fixed elevation of said first support, and d. means to vertically translate said rear wheels to lower said wheels beneath the fixed elevation of said second support.

2. A wheelchair according to claim 1 in which said first support comprises a pair of auxiliary wheels.

3. A wheelchair according to claim 1 in which said second support comprises a pair of auxiliary wheels.

4. A wheelchair according to claim 3 including means for the occupant to revolve said auxiliary wheels.

5. A wheelchair according to claim 4 in which each of said auxiliary wheels is generally in registration with one of said rear wheels, and in which said means to revolve comprises means rotationally coupling each rear wheel with an associated auxiliary wheel.

6. A wheelchair according to claim 5 in which said means rotationally coupling comprises an endless chain engaging a first sprocket secured to said auxiliary wheel and a second sprocket secured to said rear wheel.

7. A wheelchair according to claim 1 in which said means to vertically translate said front wheels comprises a vertical rod secured to each front wheel, each rod having a helically threaded portion extending through a corresponding internally threaded member secured to said frame, and including means for rotating said rod for raising and lowering said front wheel.

8. A wheelchair according to claim 7 in which said means for rotating comprises a crank affixed to the top of each rod.

9. A wheelchair according to claim 1 in which said means to vertically translate said rear wheels each comprises a bracket assembly secured to one of said rear wheels, said bracket assembly having an internally threaded segment, a vertical rod rotatably mounted on said frame, said rod having a helically threaded portion engaging said threaded segment and means for rotating said rod for raising and lowering said bracket assembly and rear wheel.

10. A wheelchair according to claim 9 in which said means for rotating comprises a crank affixed to said frame, and means interconnecting said crank and said rod for rotating said rod.

11. A wheelchair according to claim 10 in which said means interconnecting comprises an endless chain engaging a first sprocket secured to said rod and a second sprocket secured to said crank.

12. A wheelchair according to claim 9 including a fixed guide for said bracket assembly.

13. A wheelchair according to claim 12 in which said guide comprises at least one vertical support rod, said bracket being slidingly secured to said support rod.

14. In a wheelchair having a seat for an occupant secured to a frame, a pair of castered front wheels and a pair of primary rear wheels adapted to be revolved by the occupant to propel the wheelchair, the wheels normally having bearing surfaces lying in a common surface plane, the improvement comprising means to negotiate curbs and obstructions, comprising:

a. a first pair of auxiliary wheels located between said front and rear wheels, said first pair being fixed in elevation relative to the seat, b. a second pair of auxiliary wheels located behind and spaced from said rear wheels, said second pair being fixed in elevation relative to the seat, c. separate means to vertically translate said front wheels to lower said wheels beneath the fixed elevation of said first support, each comprising a vertical forward rod secured to one of said front wheels, and including means for vertically shifting said forward rod to raise and lower said front wheel, and d. separate means to vertially translate said rear wheels to lower said wheels beneath the fixed elevation of said second support, each comprising a bracket assembly secured to one of said rear wheels, said bracket assembly being mounted on a vertical rear rod mounted on said frame, and including means for vertically shifting said bracket assembly on said rear rod.

15. A wheelchair according to claim 14 in which said means for vertically shifting said forward rod comprises each forward rod having a helically threaded portion extending through a corresponding internally threaded member secured to said frame, and including a crank affixed to the top of each forward rod for rotating said rod to raise and lower said front wheel.

16. A wheelchair according to claim 14 in which said means for vertically shifting said bracket assembly comprises said bracket assembly having an internally threaded segment, said rear rod having a helically threaded portion engaging said threaded segment, and including means for rotating said rear rod.

17. A wheelchair according to claim 16 in which said means for rotating comprises a crank affixed to said frame, and means interconnecting said crank and said rear rod for rotating said rear rod.

18. A wheelchair according to claim 17 in which said means interconnecting comprises an endless chain engaging a first sprocket secured to said rear rod and a second sprocket secured to said crank.

19. A wheelchair according to claim 14 including a fixed guide for said bracket assembly.

20. A wheelchair according to claim 19 in which said guide comprises at least one vertical support rod, said bracket assembly being slidingly secured to said support rod.

* * * * *